United States Patent
Fritzler et al.

(10) Patent No.: US 7,238,948 B2
(45) Date of Patent: Jul. 3, 2007

(54) DETECTION ARRANGEMENT FOR MODULAR USE IN A COMBINED TRANSMISSION/EMISSION TOMOGRAPHY UNIT

(75) Inventors: Sven Fritzler, Erlangen (DE); Bjoern Heismann, Erlangen (DE); Joerg Pfeiffer, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 72 days.

(21) Appl. No.: 11/246,132

(22) Filed: Oct. 11, 2005

(65) Prior Publication Data

US 2006/0081899 A1    Apr. 20, 2006

(30) Foreign Application Priority Data

Oct. 12, 2004 (DE) .................. 10 2004 049 677

(51) Int. Cl.
  *G01T 1/24* (2006.01)
(52) U.S. Cl. .................................. 250/370.09
(58) Field of Classification Search ............ 250/370.09
  See application file for complete search history.

(56) References Cited

U.S. PATENT DOCUMENTS 5,138,416 A * 8/1992 Brillson .................. 257/440
5,821,540 A * 10/1998 Sato et al. ............. 250/370.06
6,448,559 B1   9/2002 Saoudi et al.
2004/0190676 A1* 9/2004 Kojima et al. ................ 378/19

FOREIGN PATENT DOCUMENTS

WO    WO 2004/104634 A1    12/2004

* cited by examiner

*Primary Examiner*—David Porta
*Assistant Examiner*—Mark R. Gaworecki
(74) *Attorney, Agent, or Firm*—Harness, Dickey & Pierce, P.L.C.

(57) ABSTRACT

A detection arrangement is for modular use for a combined transmission/emission tomography unit, for measuring transmission x-radiation and emission γ-radiation inside a detector. The detection arrangement includes at least three absorption layers of different thickness, arranged one above another in the radiation direction, for detecting absorption events in which case all of the at least three absorption layers consist of a single material. Each absorption layer is connected to a measuring chip which can transmit the measured values of location x, time t and energy E of detected absorption events to a common evaluation unit. The evaluation unit can undertake the breakdown into CT, SPECT and PET signals from the transmitted measured values of the absorption event, and the absorption layers are subdivided into a multiplicity of detection elements.

20 Claims, 2 Drawing Sheets

DETECTION ARRANGEMENT FOR MODULAR USE IN A COMBINED TRANSMISSION/EMISSION TOMOGRAPHY UNIT

The present application hereby claims priority under 35 U.S.C. §119 on German patent application number DE 10 2004 049 677.3 filed Oct. 12, 2004, the entire contents of which is hereby incorporated herein by reference.

FIELD

The invention generally relates to a detection arrangement for modular use in a combined transmission/emission tomography unit. For example, it may relate to a CT/PET/SPECT unit for measuring transmission x-radiation and emission γ-radiation, for example in the range from 40 keV to 1 MeV, inside a detector. This detection arrangement may include at least three absorption layers of different thickness, arranged one above another in the radiation direction, for detecting absorption events.

BACKGROUND

A CT method (CT=Computed Tomography) is generally understood to be a transmission tomography unit that uses x-radiation or γ-radiation to transirradiate an examination object from many directions, tomograms of the absorption properties of the examination object being calculated from the measured dose absorption of the radiation. In the case of the PET method (PET=Positron Emission Tomography), a positron-emitting substance is incorporated in the examination object, the positrons forming in conjunction with a shell electron two oppositely directed γ-quanta with 511 keV that can be measured simultaneously.

In the case of the SPECT method (SPECT=Single Photon Emission Computed Tomography), there are incorporated into the examination object single photon emitters whose decay is determined by appropriate detectors. Tomograms of the examination object are calculated in the case of both PET and of SPECT.

A detection arrangement is described in patent specification U.S. Pat. No. 6,448,559 B1. A detection arrangement is shown that is suitable for detecting PET, SPECT and CT signals. The detection arrangement shown there includes a number of absorption layers, the first and thin layer being used to measure low-energy gamma- and x-rays, the second layer being used to measure high-energy gamma radiation, and a third layer being used to measure high-energy 511 keV events. The different absorption layers include various materials, the first layer including a thin CsI(Tl) scintillator, and the layers lying therebelow constituting LSO/GSO scintillators. The design of a detection arrangement sketched out there for the combined measurement of CT/PET and SPECT signals is complicated.

SUMMARY

An object of at least one embodiment of the invention is to find an improved detection arrangement for modular use for a combined transmission/emission tomography unit.

The inventors have realized that such combined detection arrangements can be produced and operated substantially more favorably when all the absorption layers of the detection arrangement are constructed from the same material. Further, they realized a design that is as uniform as possible—with the exception of the physically required difference in layer thickness and, if appropriate, a different division of the absorption layer—should preferably be used over the entire detection arrangement. This is possible, for example, by virtue of the fact that all the layers of the detection arrangement include CMOS detectors based on direct transducers or on scintillators.

In the first case, the detector has a current-sensitive input and a digital output for each pixel, while in the second case use is made of a photosensor input and a digital output. It is preferred here to use for all the absorption layers an identical measuring chip that outputs the measured values of location, time and energy of the detected absorption events in accordance with the scanning of the absorption layer. Thus, even when measuring the CT radiation the approach is not to measure the dose rate occurring and to pass it on as a signal strength proportional thereto, but here as well absorption events are measured whose energy and number are converted into a dose rate in the evaluation unit. The integration of the energy per mass element in relation to the dose is therefore not performed during the measurement itself, but is calculated after the measurement.

In accordance with this basic idea, the inventors propose a detection arrangement for modular use in a combined transmission/emission tomography unit for measuring transmission x-radiation and emission γ-radiation, for example in the range from 40 keV to 1 MeV, inside a detector. This detection arrangement may include at least three absorption layers of different thickness, arranged one above another in the radiation direction, for detecting absorption events. The arrangement is improved to the effect that all of the at least three absorption layers consist of a single material. Each absorption layer may be connected to measuring chips which can transmit the measured values of location x, time t and energy E of detected absorption events to a common evaluation unit. Further, this evaluation unit can undertake the breakdown into CT, SPECT and PET signals from the transmitted measured values of the absorption event, and the absorption layers may be subdivided into a multiplicity of detection elements. Such a design ensures cost-effective production of the detection arrangement since use is made of very similar parts.

It is particularly advantageous when an identical measuring chip is used for the various absorption layers. The production and development outlay is hereby again sharply reduced.

It is preferably possible to use a semiconductor material, preferably CdZnTe or CdTe, as the common and sole material of the absorption layers.

It is particularly advantageous with reference to the measuring chips when the latter are designed as silicon CMOS chips, the CMOS chips preferably having different mode settings, thus enabling the operating modes to be adapted to the energy range to be measured without any problem.

The thicknesses of the absorption layers can, for example, lie in the range from 0.5 mm to 3 cm, while the upper absorption layer should have a layer thickness that, at least chiefly, detects the low-energy x-radiation, used in CT examination, of less than 100 keV. The middle absorption layer should be fashioned such that it chiefly detects the x-radiation or γ-radiation, used for CT examination and/or examinations in nuclear medicine, in the range from 100 keV to 300 keV. Finally, the at least one lower absorption layer should have a layer thickness of over 1 cm and chiefly detect γ-radiation over 500 keV, in particular the coincident γ-quanta with 511 keV produced during the positron emission.

It may be pointed out that, in the usage of this application, the upper absorption layer constitutes the absorption layer that faces the radiation and is penetrated as first layer by a beam. The lower absorption layer therefore constitutes the layer penetrated at last by a beam and which is not followed by any further absorption layer seen in the radiation direction. The middle absorption layer or the middle absorption layers are the absorption layers that is or are, respectively, arranged between the upper and the lower absorption layer.

In accordance with the idea of at least one embodiment of the invention, however, it is also possible, in particular for improved detection of the high-energy radiation, to arrange at least five absorption layers one above another, it being possible for three identical, relatively thick absorption layers to be arranged in the lower region, for example.

In accordance with a special design variant of the detection arrangement according to at least one embodiment of the invention, the at least three different absorption layers can be fashioned with reference to their thickness such that there is a continuous increase in the layer thickness in the radiation direction.

All the detection elements are preferably configured such that they are exclusively event-counting detectors with additional energy resolution of the absorption events.

In addition to the possibility of designing all the absorption layers with a continuous identical division into individual matrix elements of the same cross section, it is also possible to provide the absorption layers with different divisions. It is preferably possible in the process for the thinner absorption layers to have a finer division with smaller matrix elements, and for the thicker absorption layers to have a coarser division with larger matrix elements. In accordance with this different division of the absorption layers, measurements can then be performed with higher resolution for CT pictures for which the first or, if appropriate, also the second layer of the detection arrangement is responsible, whereas the measurements of the positron emission are performed with a lower but sufficient resolution.

Furthermore, it is within the scope of at least one embodiment of the invention to produce detector modules that have the previously described detection arrangement, the scope of at least one embodiment of the invention likewise having detectors that are constructed using a multiplicity of such detector modules.

In this case, each detector module has a multiplicity of detection elements that, when interconnected, form the known detector rows and detector columns, arranged like a matrix, of a tomography unit.

Likewise within the scope of at least one embodiment of the invention may be a combined CT unit with a PET and/or SPECT unit that has such a detector.

BRIEF DESCRIPTION OF THE DRAWINGS

Additional features and advantages of the invention emerge from the following description of example embodiments with reference to the drawings, only the essential features required for understanding the invention being illustrated in the drawings.

The invention is to be explained in more detail with the aid of the drawings, use being made of the following reference symbols:

1: detector module;
2: evaluation unit;
2.1: display screen;
2.2: keyboard;
3: housing;
4: detector;
5: focus;
6: beam;
7: patient;
8: data line;
9: control line;
Ax: xth absorption layer;
Cx: xth CMOS measuring chip;
Dx: data line to the evaluation unit of the xth measuring chip;
Sx: xth substrate;
Lx: xth detector layer;
$P_n$: programs.

Figure 1:
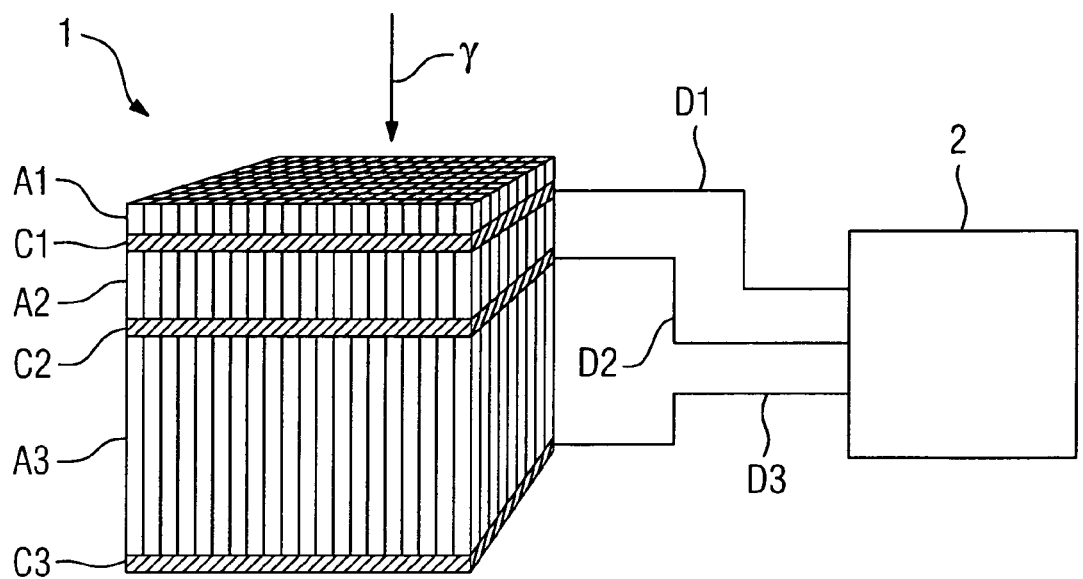
Figure 2:
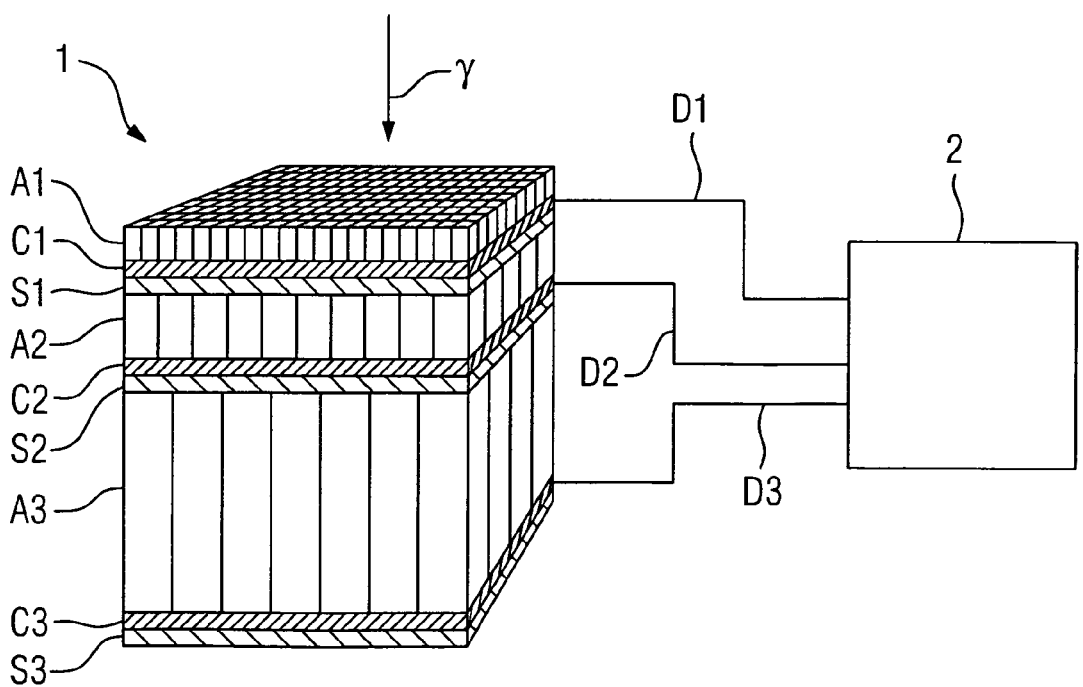
Figure 3:
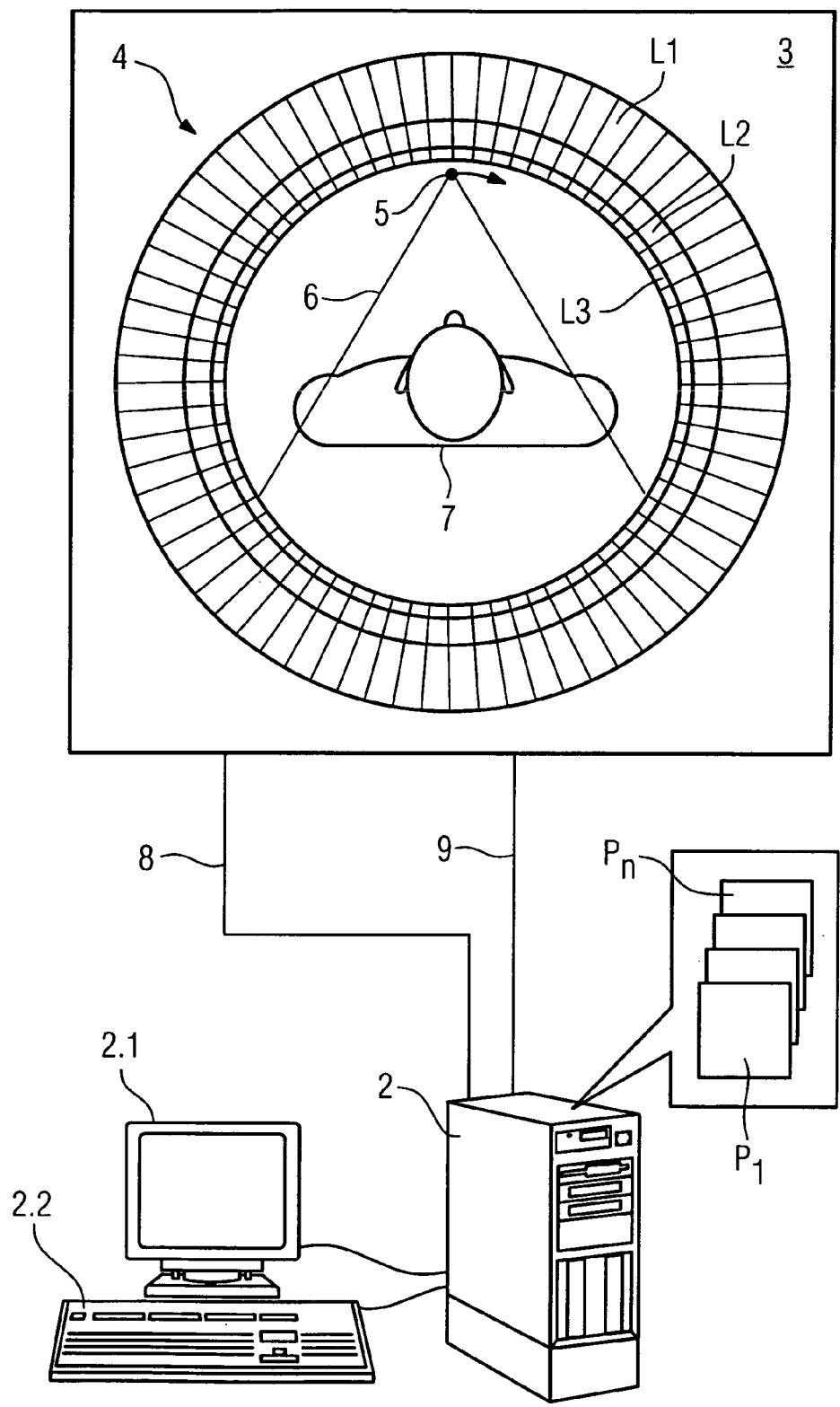

In detail:

FIG. 1 shows a detector module having a detection arrangement according to at least one embodiment of the invention;

FIG. 2 shows a detector module according to at least one embodiment of the invention having additional substrate layers between the detector layers; and FIG. 3 shows a schematic of a combined CT/PET/SPECT unit.

DETAILED DESCRIPTION OF THE EXAMPLE EMBODIMENTS

FIG. 1 shows a schematic of a detector module having a detection arrangement according to at least one embodiment of the invention. The detection arrangement includes three absorption layers A1, A2 and A3 that become thicker in the radiation direction, an associated CMOS chip for measuring the detected absorption events being arranged in each case underneath the semiconductor absorption layer. Alternatively, the detection arrangement can include a scintillator material, the measuring chip then being designed as a photosensor chip. The measuring chips C1 to C3 and their associated absorption layers A1 to A3 are split up over their surface like a matrix into individual detection elements such that the measuring chips C1 to C3 can in each case pass on the location of an absorption layer to an evaluation unit 2 via the data lines D1 to D3. The measuring chips additionally have a timing device such that the time assigned to an absorption event is likewise transmitted to the evaluation unit and, furthermore, the energy absorbed is determined and specified via the signal level of the measured absorption event.

In the evaluation unit 2, the absorption events reported are then assessed on the basis of their energy and any coincidence present with another absorption event as to whether a PET event or a SPECT event is involved, while in addition the received dose rate is calculated from the energy determined and the number of the measured absorption events in order to determine the radiation absorption so as to calculate CT images.

The design of such a detector module is very similar in terms of layers, and the detector module has identical measuring chips so that a very cost-effective design results here.

FIG. 2 likewise shows a detector module having the detection arrangement according to at least one embodiment of the invention, by contrast with the detection arrangement illustrated in FIG. 1 there being arranged in each case underneath the layer of the measuring chips C1 to C3 a layer S1 to S3 with a substrate, for example ceramic. Moreover, the absorption layers A1 to A3 have matrix-like divisions differing in area. In the case of such an arrangement, it is advantageous by contrast with the arrangement shown in FIG. 1 that the measuring chips are mechanically stabilized by the substrate lying therebelow, and are, moreover, also electrically insulated from the next absorption layer.

According to at least one embodiment of the invention, the detector modules illustrated in FIG. 1 or FIG. 2 by way of example can be assembled in matrix fashion to form a complete detector, the multiplicity of detection elements on the individual detector modules then forming the rows and columns of the overall detector.

FIG. 3 shows such a combined CT/PET/SPECT unit having a housing 3 in which a fixed detector is located here that is of annular design. In accordance with the design of the individual detector modules, the result here from inside to outside is the detector layers L1 to L3, which become thicker toward the outside, corresponding to the absorption layers A1 to A3 of the detection arrangement according to at least one embodiment of the invention. Not shown in this schematic are the intermediate layers with measuring chip and the optionally present substrate layers.

Located inside the detector ring is the patient 7, who is scanned by a rotating focus 5 that generates a beam 6, while at the same time the patient 7 is administered a substrate that enables the SPECT or PET measurement. The system is controlled by the evaluation unit 2 via a control line 9, while the collected measured data are fed to the evaluation unit via a data line 8. The evaluation unit 2 has a display screen 2.1 and a keyboard 2.2 for operation and display, computer programs $P_n$ that take over in a way known per se the tomographic evaluation and the control of the installation running in the evaluation unit 2.

It may be pointed out that at least one embodiment of the invention is not limited only to the tomography units, shown in FIG. 3, with detectors circling through 360°, but also relates to tomography units whose detectors fill up only circular segments of less than 360° or whose detectors are of flat design. Likewise, at least one embodiment of the invention also may relate to tomography units with a number, in particular 2 or 3, of foci and/or radiation sources, particularly when they are intended for recording moving objects such as, for example, cardio images.

Thus, overall at least one embodiment of the invention presents a very compact multimodal detector for CT, PET and SPECT signals that can be produced very economically owing to its very similar design of the absorption layers with identical material, preferably to its design of the measuring chips that is identical for all the absorption layers and to an identical detection of the absorption events in terms of number, location, energy and time.

It goes without saying that the abovementioned features of the embodiments of the invention can be used not only in the respectively specified combination, but also in other combinations or on their own without departing from the scope of the invention.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A detection arrangement for modular use for a combined transmission/emission tomography unit, for measuring transmission x-radiation and emission γ-radiation inside a detector, the detection arrangement comprising: at least three absorption layers of different thickness, arranged one above another in the radiation direction, for detecting absorption events, each of the at least three absorption layers consisting of a common single material, wherein each absorption layer is connected to a measuring chip for transmitting the measured values of location x, time t and energy E of detected absorption events to a common evaluation unit, wherein the evaluation unit is configured to undertake the breakdown into CT, SPECT and PET signals from the transmitted measured values of the absorption event, and wherein the absorption layers are subdivided into a multiplicity of detection elements.

2. The detection arrangement as claimed in claim 1, wherein the measuring chips of all the absorption layers are of identical configuration.

3. The detection arrangement as claimed in claim 2, wherein a semiconductor material is used as the common and sole material of the absorption layers.

4. The detection arrangement as claimed in claim 2, wherein at least one of CdZnTe and CdTe is used as the common and sole material of the absorption layers.

5. The detection arrangement as claimed in claim 2, wherein the measuring chips are designed as silicon CMOS chips.

6. The detection arrangement as claimed in claim 1, wherein the measuring chips are designed as silicon CMOS chips.

7. The detection arrangement as claimed in claim 1, wherein the thicknesses of the absorption layers lie in the range from 0.5 mm to 3 cm.

8. The detection arrangement as claimed in claim 1, wherein the upper absorption layer has a layer thickness that, at least predominantly, detects low-energy x-radiation, used for CT examination, of less than 150 keV.

9. The detection arrangement as claimed in claim 1, wherein a middle absorption layer has a layer thickness that, at least predominantly, detects x-radiation or γ-radiation, used for at least one of CT examination and examinations in nuclear medicine, in the range from 100 keV up to 300 keV.

10. The detection arrangement as claimed in claim 1, wherein at least one lower absorption layer has a layer thickness of over 1 cm and, at least predominantly, detects γ-radiation over 500 keV.

11. The detection arrangement as claimed in claim 1, wherein at least 5 absorption layers are arranged one above another.

12. The detection arrangement as claimed in claim 1, wherein at least three absorption layers of different thickness are arranged one above another, the layer thickness increasing in the radiation direction.

13. The detection arrangement as claimed in claim 1, wherein all the detection elements are exclusively configured as even-counting detection elements with additional energy resolution of the absorption events.

14. The detection arrangement as claimed in claim 1, wherein at least two absorption layers have different divisions, preferably thinner absorption layers having a finer division than thicker absorption layers.

15. A detector module for a combined CT unit with at least one of a PET unit and SPECT unit, comprising a detection arrangement as claimed in claim 1.

16. A detector for a combined CT unit with at least one of a PET unit and SPECT unit, wherein the detector is of modular construction and includes a multiplicity of detector modules in accordance with claim 15, each detector module including a multiplicity of detection elements.

17. The detector as claimed in claim 16, wherein the detection elements form detector rows and detector columns arranged like a matrix.

18. A combined CT unit with at least one of a PET unit and SPECT unit, comprising a detector of claim 17.

19. A combined CT unit with at least one of a PET unit and SPECT unit, comprising a detector of claim 16.

20. The detection arrangement as claimed in claim 1, wherein at least two absorption layers have thinner absorption layers having a finer division than thicker absorption layers.

* * * * *